United States Patent [19]

Roe et al.

[11] Patent Number: 5,194,174
[45] Date of Patent: Mar. 16, 1993

[54] METHODS FOR SUPPRESSING FUGITIVE DUST EMISSIONS

[75] Inventors: Donald C. Roe, Tabernacle, N.J.; David M. Polizzotti, Yardley, Pa.

[73] Assignee: Betz Laboratories, Inc., Trevose, Pa.

[21] Appl. No.: 746,828

[22] Filed: Aug. 19, 1991

Related U.S. Application Data

[63] Continuation-in-part of Ser. No. 539,757, Jun. 18, 1990, abandoned.

[51] Int. Cl.$^5$ .................. C09K 3/22; C11D 3/37; C11D 1/02; C11D 1/66
[52] U.S. Cl. .................. 252/173; 252/88; 252/174.23; 252/DIG. 2; 299/12; 299/13
[58] Field of Search .......... 252/88, 173, 174.23, 252/DIG. 2; 299/12, 13

[56] References Cited

U.S. PATENT DOCUMENTS

| | | | |
|---|---|---|---|
| 3,135,648 | 6/1964 | Hawkins | 161/249 |
| 3,690,727 | 9/1972 | Degginger | 299/12 |
| 3,954,662 | 5/1976 | Salyer et al. | 252/382 |
| 4,087,572 | 5/1978 | Nimerick | 427/214 |
| 4,380,459 | 4/1983 | Netting | 55/87 |
| 4,417,992 | 11/1983 | Bhattacharyya et al. | 252/88 |
| 4,551,261 | 11/1985 | Salihar | 252/88 |
| 4,561,905 | 12/1985 | Kittle | 134/25.1 |
| 4,594,268 | 6/1986 | Kirwin | 427/136 |
| 4,650,598 | 3/1987 | Roberts et al. | 252/88 |
| 4,746,543 | 5/1988 | Zinkan et al. | 427/136 |
| 4,780,143 | 10/1988 | Roe | 106/102 |
| 4,780,233 | 10/1988 | Roe | 252/88 |
| 4,801,635 | 1/1989 | Zinkan et al. | 524/156 |
| 5,124,363 | 6/1992 | Stern | 252/315.3 X |

FOREIGN PATENT DOCUMENTS

| | | |
|---|---|---|
| 49-041278 | 4/1974 | Japan . |
| 0744020 | 6/1980 | U.S.S.R. . |
| 1106908 | 8/1984 | U.S.S.R. . |

OTHER PUBLICATIONS

"Vinyl Pollyemrs (Poly (Vinyl Alcohol))", *Kirk-Othmer: Encyclopedia of Chemical Technology*, vol. 23, 3d ed., pp. 848-865.

Primary Examiner—W. J. Shine
Assistant Examiner—Douglas J. McGinty
Attorney, Agent, or Firm—Alexander D. Ricci; Steven D. Boyd

[57] ABSTRACT

An improved non-viscous aqueous dust control solution which includes a polyvinyl alcohol and boric acid. The improved solution may be spray applied or applied as a foam. The solution may include cross-linking agents, extenders, plasticizers or surfactants.

41 Claims, No Drawings

METHODS FOR SUPPRESSING FUGITIVE DUST EMISSIONS

This application is a continuation-in-part of Ser. No. 07/539,757 filed Jun. 18, 1990, abandoned.

FIELD OF THE INVENTION

The present invention relates to methods of suppressing fugitive dust emissions by applying non-viscous water based solutions including a polyvinyl alcohol to dust producing materials. The non-viscous water based solution may be applied as a foam and include cross-linking agents, extenders, plasticizers and surfactants.

BACKGROUND OF THE INVENTION

Dust dissemination poses safety, health and environmental problems in many commercial environments. For instance, dust suppression is of particular concern in the coal mining industry wherein coal dust dissemination caused by wind or transit motion may lead to black lung disease if inhaled over lengthy periods of time. In other cases, the presence of coal dust may lead to possible spontaneous combustion. Similar concerns are raised when other materials such as sulfur, phosphates, clays or other finely divided ores and minerals generate dust during handling operations, mining, transportation, storage or use.

In addition to the mining industry, many other commercial activities also provide potential for dust control problems. For instance, fertilizer dust has raised health concerns due to human and animal inhalation thereof and it also may pose a problem of spontaneous combustion. The cement industry is also concerned with fugitive dust dissemination during manufacture, transport and storage operations.

Industrial sources of fugitive dust include open operations, leaks and spills, storage, disposal, transit or poor housekeeping of sundry finely divided solid particulates. The iron and steel industries are replete with examples of the above enumerated categories. Problems associated with disposal and storage of the source of fugitive dust may be exemplified by, for instance, operation of steel mill open hearth precipitators of the type having an electrostatic precipitator to control dust emissions. The dust removed by the electrostatic precipitator is typically collected in hoppers and periodically dumped into essentially closed containers known as "collecting pans". Despite the fact that connecting hoses are extended between the hopper and collecting pans, considerable fugitive dust emissions occur during material transfer. If the electrostatically removed particulate matter is to be used as landfill, severe fugitive dust emissions can occur during the dumping thereof. Natural winds have been reported as creating great dust clouds at such landfill sites. The transportation of particulates along conveyor belts and the dumping of the particulate therefrom also creates fugitive dust emission problems of the "transportation and disposal" source type.

Oil and oil based emulsions have been used for dust control purposes. For example, U.S. Pat. No. 4,417,992, Bhattacharyya et al., discloses interalia, use of oil containing emulsions comprising light paraffinic solvents, water and sundry cross-linked polymers for dust control. Kittle, U.S. Pat. No. 4,561,905 discloses the use of foamed oil/water emulsions to control coal dust dissemination. The use of aqueous based solutions of polymers for dust control is also known. Zinkan et al., U.S. Pat. No. 4,746,543 discloses the use of an aqueous solution containing a mixture of water soluble acrylic polymers with water soluble nonionic glycol polymers with anionic surfactants such as sulfonates and nonionic co-surfactants as a dust control agent. U.S. Pat. No. 4,594,268, Kirwin discloses the use of an aqueous emulsion of a methacrylate polymer as a dust control agent. Salihar, U.S. Pat. No. 4,551,261 discloses the use of a foam, comprising water a foaming agent and elastomeric water insoluble polymers for dust suppression. The use of dilatant, or highly viscous, aqueous solution of vinyl alcohol and alkali metal borate is described in U.S. Pat. No. 3,690,727, Degginger. The described combination of a borate and a polyhydroxy alcohol comprise concentrations so as to provide a viscous, dilatant solution which is used for dust suppression.

SUMMARY OF THE INVENTION

The present invention provides improvement over the use of aqueous solutions, either foam or not, for dust control. The present invention provides an non-viscous aqueous dust control solution which exhibits improved long term, or residual dust control. Inclusion of a polyvinyl alcohol in aqueous dust control solutions which are applied as a liquid spray or foam has been found to enhance the long term or residual dust control action of the solution. The low toxicity of polyvinyl alcohol which allows its use in many food contact applications, pharmaceuticals and cosmetics may also allow its use on grain to control grain dust. The aqueous solution may include plasticizers, cross-linking agents, extenders, wetting and/or foaming agents and other dust control solution additives.

The solutions of the present invention comprise relatively low concentrations of polyvinyl alcohol for dust control. The aqueous solutions of the present invention are non-viscous solutions which are easily handled and applied with prior art water treatment equipment. By non-viscous, it is meant that the treatment solution is a newtonian fluid with a viscosity of about 1 to 2 centipoise. When a cross-linking agent is employed in the present invention, boric acid is preferred and the pH maintained below about 5 or 6 in order to maintain the non-viscous nature of the aqueous solution. Prior art uses of high concentrations of borate in combination with polyvinyl alcohol resulted in a viscous, dilatant solution. Such solutions are difficult to apply and result in a tacky, heavy residue on the treated material.

DETAILED DESCRIPTION OF THE PREFERRED EMBODIMENTS

The present invention provides improvement over the known use of aqueous based treatments for dust control purposes. It has been discovered that the addition of a low concentration of polyvinyl alcohol (PVOH) to an aqueous based dust control treatment results in non-viscous solution with improved long term or residual dust control efficacy. The non-viscous aqueous based dust control treatment solution preferably includes a cross-linking agent to improve the wet tack and adhesion properties of the solution, that is the long term or residual efficacy of the treatment. The pH of the treatment solution is maintained below about pH 6 to control gelation of a PVOH/boric acid mixture. The non-viscous treatment solution may also include surfactants such as wetting agents, or foaming agents which allow application of the solution as a foam. The non-viscous treatment solution may include polyhydric alcohol plasticizers to improve high temperature adhesion. Extenders may be included to extend or enhance the dust control efficacy and/or the cost performance of the treatment solution.

The non-viscous aqueous dust control treatment including polyvinyl alcohol (PVOH) is preferably provided in the form of a concentrated solution. This concentrated solution is diluted prior to or as the treatment is sprayed or applied via foam to the material to be treated. The inclusion of PVOH in such dust control treatments has been found to provide improved long term or residual dust control. PVOH can be included in a wide variety of aqueous dust control treatment solutions which are applied as a liquid spray or applied as foam.

The non-viscous aqueous dust control treatment of the present invention comprises PVOH and optionally other additives. The total concentration of dust control additive, including the PVOH component, can range from about 0.1% to about 10% on a percent active basis. The actual concentration will vary with the type of material being treated, the method of application, and the amount of cross-linking agent, plasticizer, extender, etc., included in the formulation. The preferred concentration on a percent active basis of the PVOH component can range from about 0.1% up to about 0.25%. Feed rates for the treatment solution can range from about 0.1 weight percent up to about 2.0 weight percent of the material being treated. These treatment levels correspond approximately to about 1 to 5 gallons of treatment solution per ton of material being treated in a liquid spray application and from about 0.5 to 2.5 gallons per ton for foam application methods. The feed rate of approximately 1.0 weight percent on coal was found to be effective in a liquid spray application. The preferred feed rate in an application as foam was found to be about 0.25 weight percent on coal.

Relatively low cost extenders can be added to the treatment solution to improve the cost—performance ratio of the treatment. For example starch, urea, and gelatin may be added to the non-viscous aqueous treatment solution along with PVOH. Lignosulfonates are also believed to be effective extenders for the dust control treatment solutions of the present invention.

For certain applications, polyhydric alcohol plasticizers may be added to the treatment solution. Such plasticizers effect the cure properties of the polymer and may provide improved high temperature adhesion thereby improving dust control efficacy of the treatment in high temperature applications. Typical polyhydric alcohol plasticizers include ethylene glycol, diethylene glycol and glycerin and mixtures and combinations thereof.

The non-viscous aqueous solution including PVOH may also include one or more anionic, cationic or non-ionic surfactants. These surfactants may act as wetting agents to facilitate contact between the aqueous solution and the dust producing material or dust particles. The surfactants may also act as foaming agents to allow the treatment solution to be applied as a foam in a manner well known in the art. Typical surfactants include alkyl benzene sulfonates, alpha olefin sulfonates, alkyl ether sulfates, alpha sulfo methyl esters, ethoxylated alkyl phenols, sulfosuccinates, betaines, sulfobetaines, linear and branched ethoxylated alcohols.

The preferred non-viscous dust control treatment of the present invention is an aqueous solution of PVOH and the cross-linking agent boric acid in a ratio of from about 10:1 to about 200:1. Boric acid in combination with PVOH at the concentrations of the present invention form a non-viscous, newtonian solution. This combination can be shipped as a concentrate and diluted with water upon application. The pH of the concentrate is maintained at about 5.0 or 6.0 to inhibit gellation.

EXAMPLES

The present invention will now be further described with reference to a number of specific examples which are to be regarded solely as illustrative, and not as restricting the scope of the present invention.

The effectiveness of methods of the present invention was tested by measuring the relative dustiness index (RDI) and percent dust suppression (% DS) for a variety of dust control treatments on samples of Illinois #6 Coal. Relative dustiness testing was performed after the samples were air-dried for 24 hours.

Determination of the relative dustiness index and percent dust suppression were measured on samples of Illinois No. 6 coal which was air dried in an environmental chamber at 20° C. and 50% relative humidity. The sample was then screened to negative ¼" and riffled (divided) into uniform 250 gram sub-samples. The sub-samples were treated by spraying the dust control treatment solution on the coal and stirring for one minute. The treated sub-samples were air dried at 20° C. and 50% relative humidity in an environmental chamber for 24 hours.

The relative dustiness index of the treated and untreated samples of coal were measured in a laboratory dust chamber equipped with an opacity monitor. The opacity monitor generated an opacity curve as a function of time, measured after introduction of the sample into the dust chamber. The relative dustiness index was measured as the area under the opacity curve. The percent dust suppression was a calculation based upon the relative dustiness index for untreated versus treated materials.

Table I summarizes the results of testing showing a large decrease in RDI and a corresponding increase in % DS resulting from the addition of PVOH to aqueous dust suppression treatments.

TABLE I

Effects of Poly(vinyl alcohol) Compositions on the Relative Dustiness (RDI) of Illinois #6 Coal

| Treatment | Concentration (% Active) | Feed Rate (Wt % on Coal) | RDI | % DS |
|---|---|---|---|---|
| Control | — | — | 35.9 | — |
| PVOH | 0.25 | 1.0 | 15.2 | 57.7 |
| PVOH/Glycerin | 0.20/0.05 | 1.0 | 11.8 | 67.1 |
| PVOH/Boric Acid | 0.24/0.01 | 1.0 | 9.6 | 73.3 |
| PVOH/Lignin | 0.05/0.20 | 1.0 | 13.4 | 62.7 |

Notes:
1. PVOH = Vinyl 540 trademark of Airco Chemicals
2. Lignin = sodium lignosulfonate
3. RDI = Relative dustiness index
4. % DS = Percent dust suppression
5. Control RDI is the average of four results.

As shown in Table I, relatively low treatment levels of PVOH in an aqueous dust suppression treatment provides effective residual dust suppression. Also, the favorable effects of plasticizers, cross-linking agents and extenders is shown.

Viscosity measurements were made with a Brookfield viscometer of an aqueous solution of 0.25% by weight PVOH and 0.0125% by weight boric acid. The graph of viscosity vs. shear rate was a straight horizontal line. This indicates a newtonian fluid. A dilatant fluid would be characterized by increasing viscosity with an increase in shear rate. Attempts to foam a dilantant solution in conventional foaming equipment were unsuccessful. Also, such dilantant solutions would be difficult to apply in conventional spray equipment due to the increasing viscosity due to shear as such materials are handled in mechanical equipment and spray nozzles.

While the present invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

What is claimed is:

1. A method of suppressing dust comprising contacting a solid particulate dust producing material with a dust inhibiting amount of a non-viscous, aqueous solution comprising boric acid and up to about 0.25% by weight a polyvinyl alcohol.

2. The method of claim 1 wherein said non-viscous, aqueous solution further includes the boric acid as a cross-linking agent in a ratio of polyvinyl alcohol:boric acid of from about 10:1 to about 200:1.

3. The method of claim 1 wherein said aqueous solution further includes a plasticizer.

4. The method of claim 3 wherein said plasticizer is selected from the group consisting of ethylene glycol, diethylene glycol, glycerin and mixtures and combinations thereof.

5. The method of claim 1 wherein said aqueous solution further includes a surfactant.

6. The method of claim 5 wherein said surfactant is selected from the group consisting of alkyl benzene sulfonates, alpha olefin sulfonates, alkyl ether sulfates, alpha sulfo methyl esters, ethoxylated alkyl phenols, sulfosuccinates, betaines, sulfobetaines, ethoxylated alcohols and mixtures and combinations thereof.

7. The method of claim 1 wherein said aqueous solution further includes an extender.

8. The method of claim 7 wherein said extender is selected from the group consisting of starch, urea, gelatin, lignosulfonates and mixtures and combinations thereof.

9. A method of suppressing dust comprising contacting a solid particulate dust producing material with a dust suppressing amount of a foam comprising water, boric acid, a foaming agent and up to about 0.25% by weight a polyvinyl alcohol.

10. The method of claim 9 wherein said aqueous solution further includes a cross-linking agent in a ratio of polyvinyl alcohol:cross-linking agent of from about 10:1 to about 200:1.

11. The method of claim 9 wherein said aqueous solution further includes a plasticizer.

12. The method of claim 11 wherein said plasticizer is selected from the group consisting of ethylene glycol, diethylene glycol, glycerin and mixtures and combinations thereof.

13. The method of claim 9 wherein said foaming agent is selected from the group consisting of alkyl benzene sulfonates, alpha olefin sulfonates, alkyl ether sulfates, alpha sulfo methyl esters, betaines, sulfobetaines, and combinations thereof.

14. The method of claim 9 wherein said aqueous solution further includes a surfactant.

15. The method of claim 14 wherein said surfactant is selected from the group consisting of ethoxylated alkyl phenols, sulfosuccinates, ethoxylated alcohols and mixtures and combinations thereof.

16. The method of claim 9 wherein said aqueous solution further includes an extender.

17. The method of claim 16 wherein said extender is selected from the group consisting of starch, urea, gelatin, lignosulfonates and mixtures and combinations thereof.

18. A method of suppressing dust comprising contacting a solid particulate dust producing material with a foam developed from a non-viscous, aqueous solution containing a foam generating agent, the improvement comprising including in said aqueous solution boric acid and up to about 0.25% by weight a polyvinyl alcohol.

19. The method of claim 18 wherein said aqueous solution further includes the boric acid as a cross-linking agent in a ratio of polyvinyl alcohol:cross-linking agent of from about 10:1 to about 200:1.

20. The method of claim 18 wherein said aqueous solution further includes a plasticizer.

21. The method of claim 20 wherein said plasticizer is selected from the group consisting of ethylene glycol, diethylene glycol, glycerin and mixtures and combinations thereof.

22. The method of claim 18 wherein said foam generating agent is selected from the group consisting of alkyl benzene sulfonates, alpha olefin sulfonates, alkyl ether sulfates, alpha sulfo methyl esters, betaines, sulfobetaines, and combinations thereof.

23. The method of claim 18 wherein said aqueous solution further includes a surfactant.

24. The method of claim 23 wherein said surfactant is selected from the group consisting of ethoxylated alkyl phenols, sulfosuccinates, ethoxylated alcohols and mixtures and combinations thereof.

25. The method of claim 18 wherein said aqueous solution further includes an extender.

26. The method of claim 25 wherein said extender is selected from the group consisting of starch, urea, gelatin, lignosulfonates and mixtures and combinations thereof.

27. A method of suppressing dissemination of fugitive dust particles from a solid particulate into the atmosphere wherein a newtonian aqueous solution is applied to said dust particles, the improvement comprising including in said aqueous solution boric acid and from about 0.1% up to about 0.25% by weight a polyvinyl alcohol.

28. The method of claim 27 wherein said aqueous solution further includes the boric acid as a cross-linking agent in a ratio of polyvinyl alcohol:cross-linking agent of from about 10:1 to about 200:1.

29. The method of claim 27 wherein said aqueous solution further includes a plasticizer.

30. The method of claim 29 wherein said plasticizer is selected from the group consisting of ethylene glycol, diethylene glycol, glycerin and mixtures and combinations thereof.

31. The method of claim 27 wherein said aqueous solution further includes a surfactant.

32. The method of claim 31 wherein said surfactant is selected from the group consisting of alkyl benzene sulfonates, alpha olefin sulfonates, alkyl ether sulfates, alpha sulfo methyl esters, ethoxylated alkyl phenols, sulfosuccinates, betaines, sulfobetaines, ethoxylated alcohols and mixtures and combinations thereof.

33. The method of claim 27 wherein said aqueous solution further includes an extender.

34. The method of claim 33 wherein said extender is selected from the group consisting of starch, urea, gelatin, lignosulfonates and mixtures and combinations thereof.

35. A method of suppressing dissemination of fugitive dust particles from a solid particulate into the atmosphere wherein a non-viscous, aqueous solution is applied to said dust particles, the improvement comprising including in said aqueous solution up to about 0.25% by weight of a polyvinyl alcohol cross-linked with boric acid, in a ratio of polyvinyl alcohol:boric acid of from about 10:1 to about 200:1.

36. The method of claim 35 wherein said aqueous solution further includes a plasticizer.

37. The method of claim 36 wherein said plasticizer is selected from the group consisting of ethylene glycol, diethylene glycol, glycerin and mixtures and combinations thereof.

38. The method of claim 35 wherein said aqueous solution further includes a surfactant.

39. The method of claim 38 wherein said surfactant is selected from the group consisting of alkyl benzene sulfonates, alpha olefin sulfonates, alkyl ether sulfates, alpha sulfo methyl esters, ethoxylated alkyl phenols, sulfosuccinates, betaines, sulfobetaines, ethoxylated alcohols and mixtures and combinations thereof.

40. The method of claim 35 wherein said aqueous solution further includes an extender.

41. The method of claim 40 wherein said extender is selected from the group consisting of starch, urea, gelatin, lignosulfonates and mixtures and combinations thereof.

* * * * *